United States Patent [19]

Thurau

[11] Patent Number: 5,043,126
[45] Date of Patent: Aug. 27, 1991

[54] METHOD FOR THE PRODUCTION OF A STOPCOCK FOR MEDICAL DEVICES CONSISTING OF PLUG AND HOUSING

[75] Inventor: Bernd Thurau, Sommerhalde, Fed. Rep. of Germany

[73] Assignee: Frank Plastic GmbH, Fed. Rep. of Germany

[21] Appl. No.: 444,173
[22] PCT Filed: Jun. 3, 1988
[86] PCT No.: PCT/D388/00327
§ 371 Date: Nov. 22, 1989
§ 102(e) Date: Nov. 22, 1989
[87] PCT Pub. No.: WO88/09713
PCT Pub. Date: Dec. 15, 1988

[30] Foreign Application Priority Data

Jun. 5, 1987 [DE] Fed. Rep. of Germany ....... 3718815

[51] Int. Cl.⁵ .............................................. B29C 45/14
[52] U.S. Cl. ..................................... 264/242; 264/225
[58] Field of Search ................................ 264/242, 255

[56] References Cited

U.S. PATENT DOCUMENTS

| | | | |
|---|---|---|---|
| 3,917,789 | 11/1975 | Heisler | 264/242 |
| 4,003,403 | 1/1977 | Nehring | 137/625.41 |
| 4,147,184 | 4/1979 | Jess | 137/625.47 |
| 4,180,542 | 12/1979 | Wrasman | 264/242 |
| 4,197,876 | 4/1980 | Lobdrell | 137/625.47 |
| 4,414,170 | 11/1983 | Sano | 264/242 |

FOREIGN PATENT DOCUMENTS

| | | |
|---|---|---|
| 0147571 | 11/1985 | European Pat. Off. . |
| 2355273 | 10/1975 | Fed. Rep. of Germany . |
| 3413721 | 9/1985 | Fed. Rep. of Germany . |
| 2316060 | 6/1976 | France . |
| 58219031 | 12/1983 | Japan . |
| 1222559 | 8/1971 | United Kingdom ................ 264/242 |
| 1554635 | 3/1979 | United Kingdom . |

OTHER PUBLICATIONS

Patent Abstracts of Japan, vol. 8, No. 73, (M-287) (1510), Apr. 4, 1984, & JP, A, 58219031 (Sony), Dec. 20, 1983.

*Primary Examiner*—Jan H. Silbaugh
*Assistant Examiner*—Brian Jones
*Attorney, Agent, or Firm*—Walter A. Hackler

[57] ABSTRACT

A method for the production of stopcocks for medical devices including a plug and a housing made of plastic. First one of the two parts (1 or 9) is injected and afterwards the other part (9 or 1) is injected into or around the already manufactured part (1 or 9).

1 Claim, 1 Drawing Sheet

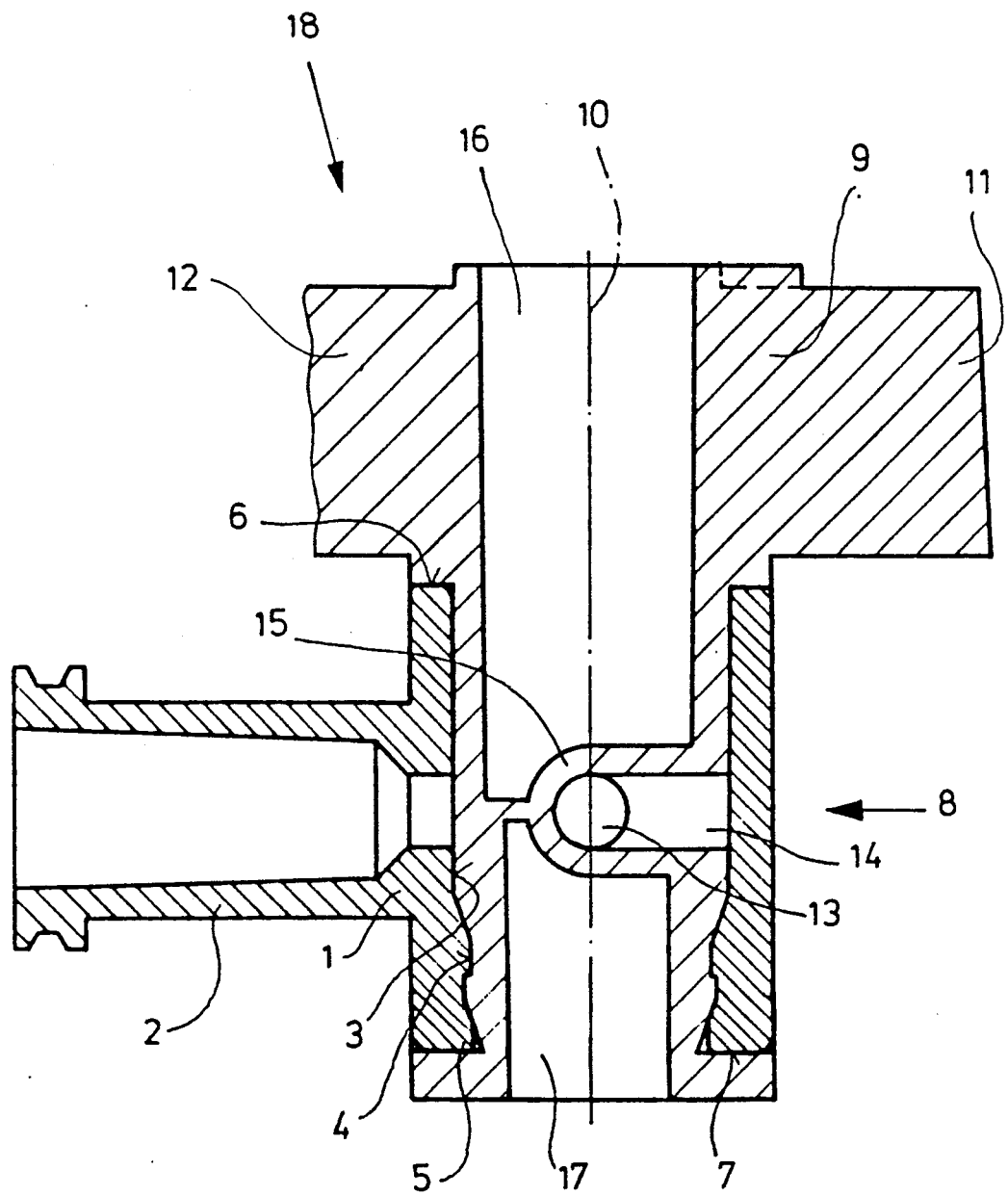

METHOD FOR THE PRODUCTION OF A STOPCOCK FOR MEDICAL DEVICES CONSISTING OF PLUG AND HOUSING

The invention relates to a method for the production of a plastic stopcock consisting of a plug and a housing which is used in connection with medical devices, for example in connection with infusion devices.

Known stopcocks having this purpose are made of plastic, however, housing and plug are injected in separate moldings. These parts are assembled after lubricating the neighboring sliding surfaces with silicon oil. Therefore, both parts must be formed such way that they allow an assembly as easy as possible. The undercuts which keep the plug tight after it has been inserted into the housing, therefore cannot undercut the plug very much, since otherwise the insertion of the plug into the housing would be hampered considerably. But the smaller such undercuts are the more probably the problem arises that the stopcocks are not leakproof enough or, however, if the stopcock is connected into a conduit in which liquid or gas is being carried under relatively high pressure, the plug could be pushed out of the housing. Such accidents can be dangerous for the patient's life.

The document EP-A-0 147 571 discloses a method where an injection molding part consists of several single parts. The injection molding part in this method is produced by injecting a first part into a first injection mold which part is then removed from the injection mold and then is put into a second injection mold where a second part is injected to the first part. Corresponding to the number of parts this procedure is continued and thus the injected substance is every time removed from the injection mold and inserted into the next injection mold. This method has a substantial disadvantage with the medical devices as discussed herein, namely that by changing the injection mold the risk of contamination is quite high. Since, however, medical devices and therefore also its parts are subjected to underly rigid hygienic regulations this method is not to be applied for the production of these devices.

FR-A-2 316 060 discloses a method where an object consisting of two parts is produced in an injection mold by injecting first one part of it and afterwards the other part of it. This method however, aims to achieve that the connection of the two parts has a big enough clearance, so that the one part is easily movable relative to the other part. In the case of a plug arranged within the housing of a stopcock it is demanded in first instance that the stopcock inside the housing is arranged that way that the medium flowing inside the stopcock cannot escape therefrom.

The object of the invention is to increase the operational security of stopcocks.

This object is solved in the present invention in that stopcock and housing are no longer mounted together right after their production but that first one of the parts is injected and then the other part is injected into or around the afore-in-jected part. Preferably this method can be carried out in one single injection molding form, thus, at first one of the parts can be injected and then without removing this part from the form the second part can be injected into this form in or around the initially injected part.

Thus, it is possible to form the bordering face between both parts such way that the plug cannot be removed from the housing not even under high pressure, and that for example if the bordering face between both parts is shaped labyrinth-like the stopcock is leakproof even under high gas or liquid pressure. Finally also the later assembly of housing and plug becomes unnecessary, so that the surfaces of the stopcock which get into connection with the infusion liquid are sterile.

Indeed it was already known to produce a toy animal in only one injection molding form in two injection procedures by using two differently dyed plastic masses, for example a monkey whose body is made of brown dyed PVC and whose face consists of beige dyed PVC, however, these are not parts which have to be movable relative to each other and nevertheless must be sufficiently sealing at the bordering face between the two plastic parts. They also do not have to meet the other requirements which medical devices have to meet.

SUMMARY OF THE INVENTION

In one embodiment of the invention both parts are injected under use of different plastic materials. Thus, the primarily injected part is not to become soft again when the second part is being injected. Therefore the materials should, at least when thermoplastics are used, have a different injection temperature. The plug can consist of a polyethylene and the housing of a polycarbonate, for example a polyethylene is used which has an injection temperature of about 220° C. and a polycarbonate which has an injection temperature of about 300° C. The use of these two materials has the further advantage that the bordering faces between the two parts can slide onto each other and thus the plug can easily rotate within the housing A special advantage is the fact, as above mentioned, that the surfaces between plug and housing which slide onto each other are sealed in any case.

In one embodiment of the invention both materials are chosen to have a dimensional shrinkage of between 0.2 and 0.8%.

BRIEF DESCRIPTION OF THE DRAWINGS

In order to illustrate the method according to the present invention the stopcock produced according to the method is shown in the drawing in a section.

DETAILED DESCRIPTION

The stopcock housing 1 has a connecting piece 2 and a slightly conic inner recess 3 running at right angles to the connecting piece 2, the recess 3 having projections 4 and 5 projecting to the inside An upper 6 and a lower front face 7 limit the stopcock housing 1. This part is firstly injected into an injection mold a polycarbonate at an injection temperature of about 300° C. being used, which can be obtained in open trade as General Electric Lexan ® 164 R. Here the injection mold is held at a constant temperature of between 75°–120° C. The injection direction is shown by the arrow 8.

A plug 9 has horizontally to its axis 10 handles 11 and 12 and a centrally running bore 13, in which a thereto rectangular bore 14 ends The bores 13 and 14 are provided in a massive intermediate piece 15 of the plug; above the intermediate piece there is a cavity 16 and below it a cavity 17 is provided. After the housing 1 was injected the plug 9 is being injected through another injection opening of the tool the injection direction being characterized by the arrow 18. As material for the plug 11 for example a polyethylene with an injection temperature of about 220° C. can be used which is sold by BASF as Lupolen ® 60/31M. In doing so, the tool is being kept at a temperature of about 30° Celsius. It is essential that both materials when injecting the second part, in the shown example the plug, do not join since otherwise the danger would arise that the plug 9 is not movable within the housing 1.

As can be seen from the drawing the plug overlaps entirely the two front faces 6 and 7 of the housing 1. This construction provides a sufficient sealing of the mutually sliding surfaces. Also the course of the bordering faces near the projections 4 and 5 of the housing 1 increases the sealing of the bordering faces between the housing 1 and the plug 9. If necessary the projections 4 and 5 can be formed as ring shoulders having a rectangular cross-section, or they can be spared if the sealing effect is sufficiently guaranteed by the overlapping of the front faces 6 and 7. The material for the plug 9 and the housing 1 can be dyed differently from each other.

What is claimed is:

1. The method for the production of a sterile stopcock for medical devices, said sterile stopcock having a plug (9) and a housing (1) (1), said method comprising the steps of:

injecting a polycarbonate having dimensional shrinkage of between 0.1 and 0.8% into a single mold, at an injection temperature of about 300° C., to form a housing (1) having a connecting piece (2) and a conic inner recess (3) disposed at a right angle thereto, said recess having inwardly facing projections (4, 5), said housing further having an upper face (6) and a lower face (7), said mold being held at a constant temperature of between 75° to 120° C. during injection of said polycarbonate, and afterwards;

injecting a polyethylene having dimensional shrinkage of between 0.1 and 0.8% into the single mold in and over said housing (1) at an injection temperature of about 220° C. to form the plug (9), said plug (9) conforming to the housing conic inner recess (3), inwardly facing projections (4, 5) and housing upper and lower faces (6, 7) in a liquid or gas-tight manner, enabling subsequent rotation of the plug (9) within the housing (1) said mold being held at a temperature of about 30° C. during injection of said polyethylene.

* * * * *